(12) United States Patent
Adler et al.

(10) Patent No.: US 9,982,842 B2
(45) Date of Patent: May 29, 2018

(54) METHOD FOR PERFORMING A PRESSURE TEST ON A TANK AND TANK FILLING APPARATUS

(71) Applicants: Robert Adler, Gerasdorf (AT); Martin Pfandl, Rust im Tullnerfeld (AT); Markus Rasch, Sulz in Wienerwald (AT); Michael Stefan, Zillingdorf (AT)

(72) Inventors: Robert Adler, Gerasdorf (AT); Martin Pfandl, Rust im Tullnerfeld (AT); Markus Rasch, Sulz in Wienerwald (AT); Michael Stefan, Zillingdorf (AT)

(73) Assignee: Linde Aktiengesellschaft, Munich (DE)

( * ) Notice: Subject to any disclaimer, the term of this patent is extended or adjusted under 35 U.S.C. 154(b) by 81 days.

(21) Appl. No.: 14/421,031

(22) PCT Filed: Aug. 27, 2013

(86) PCT No.: PCT/EP2013/002583
§ 371 (c)(1),
(2) Date: May 29, 2015

(87) PCT Pub. No.: WO2014/037085
PCT Pub. Date: Mar. 13, 2014

(65) Prior Publication Data
US 2016/0010799 A1    Jan. 14, 2016

(30) Foreign Application Priority Data

Sep. 4, 2012  (DE) .................. 10 2012 017 489
Sep. 13, 2012 (DE) .................. 10 2012 018 109

(51) Int. Cl.
F17C 5/06      (2006.01)
F17C 5/04      (2006.01)
F17C 7/00      (2006.01)
(Continued)

(52) U.S. Cl.
CPC ................ *F17C 5/06* (2013.01); *F17C 5/007* (2013.01); *F17C 5/02* (2013.01); *F17C 5/04* (2013.01);
(Continued)

(58) Field of Classification Search
CPC .... F17C 5/007; F17C 5/02; F17C 7/00; F17C 5/04; F17C 2260/036; F17C 2260/023;
(Continued)

(56) References Cited

U.S. PATENT DOCUMENTS 3,365,242 A * 1/1968 Marchetti ............... C21B 5/003
                                                    266/183
6,327,898 B1 * 12/2001 Harris ................ F02M 25/0818
                                                    73/49.2
(Continued)

FOREIGN PATENT DOCUMENTS

DE     10 2007 012080 A1    9/2008
EP      0 653 585 A1         5/1995
(Continued)

*Primary Examiner* — Manish S Shah
*Assistant Examiner* — Suman K Nath
(74) *Attorney, Agent, or Firm* — Philip H. Von Neida

(57) ABSTRACT

A method for performing a pressure test on a tank (e.g. hydrogen tank) and a filling apparatus is disclosed. The tank is connected via a tank valve to a tank feed line which has a first valve for shutting off the tank feed line, wherein during the pressure test prior to the tank being filled through the tank feed line a flow of medium, with the first valve closed, is directed into the tank via a bypass line bridging the first valve, wherein the flow of medium is throttled in the bypass line such that a tank feed pressure acting on the tank valve rises in a controlled manner, wherein the tank valve opens particularly when the tank feed pressure exceeds the pressure prevailing in the tank.

9 Claims, 1 Drawing Sheet

(51) Int. Cl.
*F17C 5/00* (2006.01)
*F17C 5/02* (2006.01)

(52) U.S. Cl.
CPC ........ *F17C 7/00* (2013.01); *F17C 2205/0323* (2013.01); *F17C 2205/0326* (2013.01); *F17C 2205/0332* (2013.01); *F17C 2205/0338* (2013.01); *F17C 2221/012* (2013.01); *F17C 2223/0123* (2013.01); *F17C 2223/036* (2013.01); *F17C 2225/0123* (2013.01); *F17C 2225/036* (2013.01); *F17C 2227/0337* (2013.01); *F17C 2227/04* (2013.01); *F17C 2250/0443* (2013.01); *F17C 2250/0478* (2013.01); *F17C 2250/0626* (2013.01); *F17C 2260/023* (2013.01); *F17C 2260/036* (2013.01); *F17C 2260/042* (2013.01); *F17C 2265/065* (2013.01); *F17C 2270/0139* (2013.01); *Y02E 60/321* (2013.01)

(58) Field of Classification Search
CPC ...... F17C 2250/0478; F17C 2227/0337; F17C 2227/04
USPC ..................................... 73/37, 40, 49.2, 49.3
See application file for complete search history.

(56) References Cited

U.S. PATENT DOCUMENTS

| | | | |
|---|---|---|---|
| 8,997,771 B2* | 4/2015 | Lee ...................... | G05D 16/208 137/1 |
| 2002/0014277 A1 | 2/2002 | Togasawa et al. | |
| 2006/0246177 A1* | 11/2006 | Miki ...................... | F17C 5/007 426/24 |
| 2010/0175778 A1* | 7/2010 | Adler ...................... | F17C 5/007 141/4 |
| 2011/0056571 A1* | 3/2011 | Bayliff ...................... | F17C 7/00 137/14 |
| 2011/0076192 A1* | 3/2011 | Robitaille ............... | A61L 2/202 422/29 |
| 2014/0257721 A1* | 9/2014 | Thompson ............ | G01M 3/226 702/51 |

FOREIGN PATENT DOCUMENTS

| | | |
|---|---|---|
| EP | 1 291 574 A2 | 3/2003 |
| EP | 1 772 663 A1 | 4/2007 |

* cited by examiner

METHOD FOR PERFORMING A PRESSURE TEST ON A TANK AND TANK FILLING APPARATUS

CROSS-REFERENCE TO RELATED APPLICATIONS

This application claims priority under 35 USC § 119 to International Patent Application No. PCT/EP2013/002583 filed in the European Patent Office on Aug. 27, 2013, which claims priority from German Patent Application No. 102012018109.4 filed on Sep. 13, 2012, and German Patent Application 102012017489.6 filed on Sep. 4, 2012.

BACKGROUND OF THE INVENTION

The invention relates to a method for performing a pressure test on a tank and a tank filling apparatus for filling a tank with a gaseous pressurized medium, in particular in the form of hydrogen, using a filling apparatus for filling a tank with a gaseous pressurized medium, with: a tank feed line, comprising a first valve for shutting of the tank feed line, wherein the tank feed line is designed to be connected downstream of the first valve to a tank to be filled.

Vehicles which refuel with gaseous hydrogen as a fuel require specially designed filling apparatuses, which can convey the hydrogen under a comparatively high pressure (e.g. 700 bar) into the (vehicle) tank or another hydrogen tank. Such a filling station usually has a storage tank with liquid hydrogen or is directly connected to a hydrogen pipeline or other plant which can constitute a hydrogen storage tank. Since the hydrogen should be present in the gaseous phase for the filling, a filling station usually comprises a gas buffer storage tank, which is supplied from the aforementioned (liquid hydrogen) storage tank and holds available the gaseous hydrogen.

In order to ensure safety (explosion risk) for the surroundings when filling hydrogen tanks (e.g. vehicle tanks) with hydrogen and in order to create a standard for the filling process, a consortium comprising, amongst others, a number of car manufacturers agreed on standard SAE J2601. The standard provides, amongst other things, safety-related limits and performance requirements for the filling process. SAE J2601 makes provision such that hydrogen-powered vehicles are refueled within three minutes to 700 bar, without the temperature of the tank thereby rising above a temperature of 85° C.

Furthermore, standard SAE 2601 makes provision such that, prior to the filling of the tank, a pressure and tightness test is carried out; amongst other things, to ensure that the tank feed line of the filling station has been connected correctly to the tank to be filled.

The pressure in the tank is ascertained in said pressure test. This takes place by means of a short pressure surge from the filling station in order to open the tank concerned, which is secured by a tank valve (usually a non-return valve). The pressure established in the tank feed line, which is then equal to the pressure in the tank, is then measured in the filling station over a certain time (waiting period of approx. 5-20 s) in order to ensure that no significant drop in pressure occurs (tightness test), which would indicate a problem, such as for example a leakage in the tank feed line or in the connection to the tank.

The pressure surge for the pressure and tightness test is usually carried out directly from the gas buffer storage tank by the relatively rapid opening of valves, which leads to high mass flows from which enormous pressure peaks can then arise, so that downstream elements in the pipelines or the tank feed line, such as for example pressure transmitters, thermometers, flow measuring devices, valves and ramp regulators, are fully subjected to this pressure surge (approx. 800-850 bar). Furthermore, with this kind of pressure surge carried out directly from the gas buffer storage tank at the start (after said waiting period) of the actual filling process, there is often a further pressure peak in the downstream elements, which is due to a pressurized residual volume in parts of the pipeline. Such load alternations in the pipeline and the tank feed line contribute towards more rapid wear of the downstream elements and therefore to increased susceptibility to multifunction and shortening of the useful life of these components.

In addition, shut-off devices using temperature, pressure or drop in pressure (leakage) are usually no longer active at the time of the pressure surge, so that overheating, overfilling of a tank or partial filling of a non-tight tank can also occur in the worst cases during the pressure surge.

Proceeding from this, therefore, the problem underlying the present invention is to provide a method and a device of the type mentioned at the outset, wherein the aforementioned loads are reduced.

This problem is solved by a method for performing a pressure test on a (hydrogen) tank as described in detail below.

SUMMARY OF THE INVENTION

Accordingly, provision is made such that the tank is connected via a tank valve to a tank feed line, which has a first valve for shutting off the tank feed line, wherein during the pressure test prior to the tank being filled with the gaseous pressurized medium (e.g. hydrogen) via the tank feed line, a (gaseous) flow of the medium (e.g. hydrogen flow) is conveyed, with the first valve closed, to the tank via a bypass line bridging the first valve, wherein the flow of medium is throttled in the bypass line, so that a tank feed pressure acting on the tank valve rises in a controlled manner, i.e. gradually without the formation of a pressure peak (particularly within a predefined period of time), in order to avoid a pressure peak or surge, until in particular the tank valve opens when the tank feet pressure exceeds the pressure prevailing in the tank.

Advantageously, the throttling thus preferably causes a high pressure loss, as a result of which only a small mass through flow of the medium (e.g. hydrogen) is possible and the pressure shook on the following components is reduced.

After the opening of the tank valve, the tank pressure prevailing in the tank is then preferably adopted as the instantaneous tank feed pressure (the tank feed pressure corresponds to the tank pressure as a result of the pressure equalization after the opening of the tank valve).

Said tank is in particular a tank of a vehicle for storing gaseous hydrogen, which serves in particular as a fuel for powering the vehicle.

The gaseous flow of medium is preferably throttled by means of a throttle provided in the bypass line, i.e. in particular by a narrowing of the bypass line cross-section, so that the tank feed pressure downstream of the throttle acting on the tank or on the tank valve rises in a controlled manner in order to prevent said pressure peak or surge (see above).

The bypass line can preferably be shut off by means of a second valve, which is preferably provided upstream of the throttle in the bypass line, wherein the second valve is opened to perform the pressure test with the first valve closed and the flow of medium via the bypass line and its throttle is conveyed to the tank, wherein the flow of medium is preferably throttled in such a way that the tank feed pressure reaches the tank pressure inside a predefined period of time (in particular 10 s).

If, for example, the tank is completely filled with hydrogen with a density of 40.2 g/l, which at room temperature corresponds to approx. 700 bar, and the volume enclosed by the tank feed line downstream of the throttle amounts to 1 l, the throttle throttles the flow of medium (hydrogen flow) preferably to 4.1 g/s, since it is then ensured that the tank feed pressure rises in 10 s to over 700 bar and the tank valve is thus opened.

Furthermore, the bypass line is preferably shut off by means of the second valve when the tank valve of the tank is opened by the rising tank feed pressure, i.e. when the tank feed pressure exceeds the tank pressure hitherto prevailing in the hydrogen tank.

The first and the second valve are preferably controlled pneumatically.

A predefined maximum pressure in the tank feed line of in particular 875 bar preferably prevails upstream of the first valve prior to the filling, i.e. in particular during the pressure test.

This maximum pressure is determined chiefly by the pressure (medium or hydrogen) made available by the gas buffer storage tank of the filling station and is rated such that it lies above the highest tank pressure to be expected, in order reliably to ensure opening of the tank and therefore a determination of the tank pressure.

Furthermore, the tank feed pressure is preferably picked up in order to determine the tank pressure, wherein the tank feed pressure of the medium or the hydrogen established in the tank feed line after the opening of the tank valve is ascertained as the tank pressure.

After performance of the pressure test and before the actual filling of the tank (passing through a pressure ramp), a certain period of time is preferably awaited (preferably 5 s to 25 s), so that a possible leakage in the connection to the tank can be detected on the basis of any drop in pressure of the tank feed pressure (tightness test). The actual filling process is preferably initiated with the existing tightness (passing through a pressure ramp proceeding from the ascertained tank pressure as a starting value).

Furthermore, the problem according to the invention is solved by a filling apparatus for filling a tank with a pressurized gaseous medium, in particular in the form of hydrogen, using a filling apparatus for filling a tank with a gaseous pressurized medium, with: a tank feed line, comprising a first valve for shutting of the tank feed line, wherein the tank feed line is designed to be connected downstream of the first valve to a tank to be filled.

Accordingly, the filling apparatus (filling station) comprises a tank feed line with a first valve for shutting off the tank feed line, wherein the tank feed line is designed to be connected in a flow-conducting manner downstream of the first valve to a tank valve of a tank to be filled. Furthermore, the filling apparatus comprises a bypass line which bridges the first valve and comprises a second valve and a throttle (e.g. narrowing of the bypass line cross-section), wherein the throttle is designed to throttle—prior to the tank being filled via the first valve—a (gaseous) flow of medium (e.g. hydrogen flow) conveyed via the bypass line with the first valve closed and the second valve opened, in such a way that the tank feed pressure established in the tank feed line downstream of the throttle rises in a controlled manner, i.e. comparatively slowly (in particular over a predefined period of time) (see above).

The bypass line correspondingly comprises two ends for bridging the tank feed line, wherein the first end is connected upstream and the second end downstream of the first valve in a flow-conducting manner to the tank feed line.

The throttle is preferably disposed downstream of the second valve in the bypass line.

As a result, the invention enables in particular the minimization of the loading of gas-conveying components in the filling apparatuses for the filling of tanks with gaseous hydrogen (and other gaseous and pressurized media) as well as the minimization of the susceptibility to malfunction in the pressure holding test by avoiding the temperature rise due to the sudden compression. Furthermore, the gas quantity filled by the pressure surge, in particular, is minimized, so that with full tanks virtually no further mass flow occurs into the tank.

BRIEF DESCRIPTION OF THE DRAWINGS

Further details and advantages of the invention will be explained by the following descriptions of the figures of an example of embodiment with the aid of the figures.

In the figures.

DETAILED DESCRIPTION OF THE INVENTION

Figure 1:
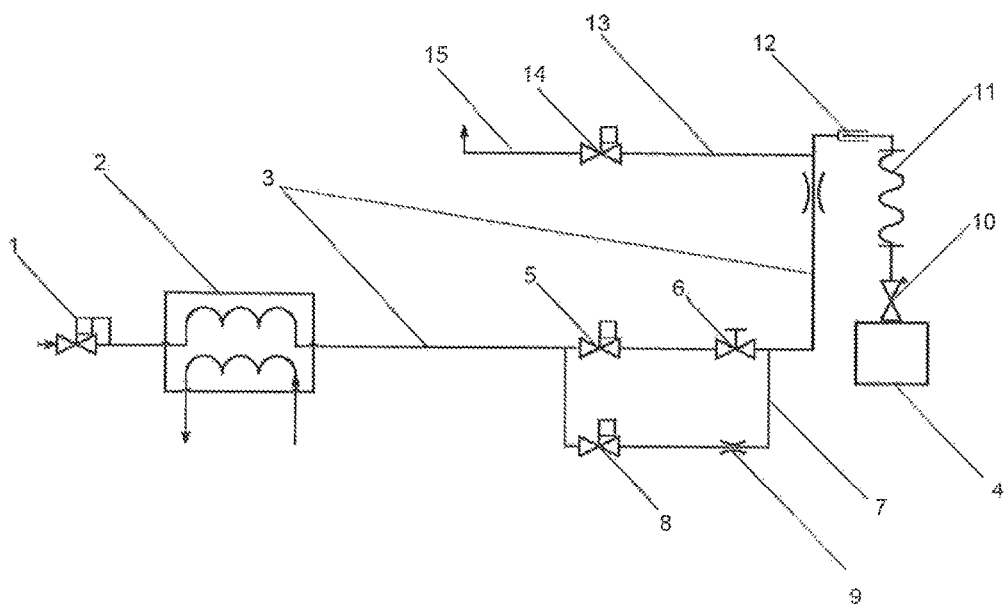
FIG. 1 snows a diagrammatic representation of a filling apparatus according to the invention.

FIG. 1 shows a diagrammatic representation of a filling apparatus (filling station), with a ramp valve 1, which is controlled by means of a ramp regulator. Disposed downstream of ramp valve 1 is a refrigerating machine 2 (aluminium cold fill), which temperature-regulates a hydrogen flow (e.g. from a gas buffer storage tank) flowing through ramp valve 1, in particular to −40° C. Connected to refrigerating machine 2, in a flow-conducting manner, is a tank feed line 3, which comprises a first, in particular pneumatic valve 5, followed by a manual valve 6 downstream of the refrigerating machine. Bypass line 7 is disposed bridging first valve 5 and manual valve 6, said bypass line being connected in a flow-conducting manner to tank feed line 3. Bypass line 7 comprises a second, in particular pneumatic valve 8, followed by a throttle 9. Disposed downstream of throttle 9 is a flow measuring device 13 in tank feed line 3. Downstream of flow measuring device 13, a chimney line 15 branches off from tank feed line 3. Chimney line 15 is connected via a safety valve 14 to a chimney, which is used to reliably discharge excess hydrogen (or excess medium) into the surroundings (e.g. in order to reduce an excess pressure in tank feed line 3). Downstream of the branching of chimney line 15, tank feed line 3 also comprises, for safety reasons, a tear-away coupling 12 which opens when pulled (if for example a car drives off with the hose coupled) and a following tank hose 11 with a tank coupling, which can be connected to the tank (hydrogen tank) 4. Tank 4 is secured for the closing of tank 4 with a tank valve 10 (non-return valve).

Figure 2:
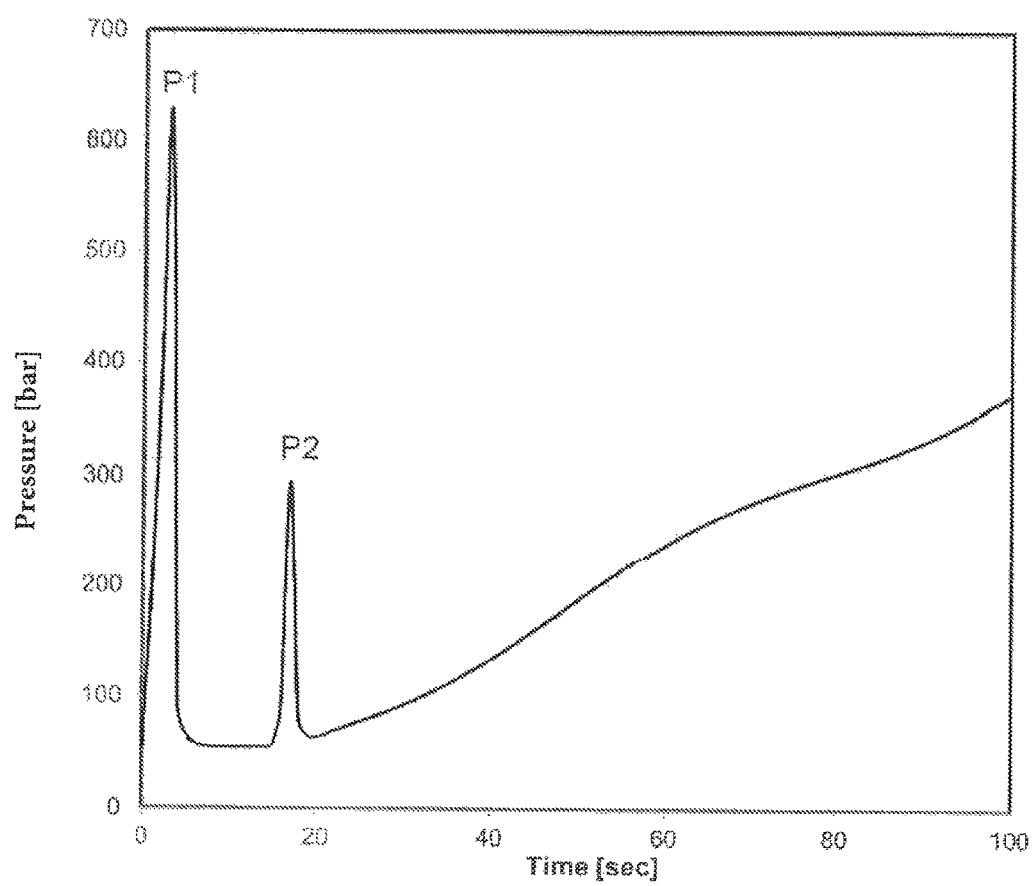
FIG. 2 shows a time-related pressure curve in the tank feed line in a pressure and tightness test carried our according to the prior art.

FIG. 2 stows the time-related pressure curve during the performance of the pressure and tightness test and the start of the actual filling process according to the prior art according to standard SAE J2601 at a conventional filling station. A pressure surge is carried out prior to the filling directly from a gas buffer storage tank (approx. 850 bar).

The pressure in the tank feed line, via which the tank is filled, correspondingly exhibits, prior to passing through a pressure ramp (rising pressure branch to the right) for the filling of the tank, marked peaks P1, P2, which result from the pressurising of the tank feed line with hydrogen from the gas buffer storage tank.

When the method according to the invention is carried out for the performance of a pressure test, on the other hand, second valve 8 is opened prior to the opening of first valve 5 for the filling of tank 4 with gaseous pressurized hydrogen, wherein the hydrogen flow in the course of tank feed line 3 following downstream of throttle 9 is throttled by means of throttle 9, so that the tank feed pressure in tank feed line 3 rises comparatively more slowly, i.e. avoiding a marked pressure peak, in a controlled manner (in particular monotonically). The tank feed pressure rises until such time as it is greater than the tank pressure prevailing in tank 4. Tank valve 10 is thereby opened or pushed open and a pressure equalisation between tank 4 and tank feed line 3 is initiated. The tank pressure is now adopted as the tank feed pressure measured in the tank feed line (pressure test). By means of an appropriate design of the throttle, the rise in the tank feed pressure in the tank feed line to the tank pressure takes place within a predetermined period of time. Generally, the throttle can be constituted so as to be correspondingly adjustable.

If the tank pressure thus ascertained remains constant over a certain period of time (in the region of 5 s to 25 s), it can be concluded that there is a tight connection to tank 4. When there is a successful tightness test, the actual filling process (e.g. according to SAE J2601) is then carried out via first valve 5 and ramp valve 1, whereby a corresponding pressure ramp is passed through, proceeding from the tank pressure as a starting value. The tank feed pressure in the tank feed line or the tank pressure in the tank thereby rises essentially linearly, proceeding from said starting value, as a result of the filling of the tank with gaseous hydrogen.

| REFERENCE LIST | |
|---|---|
| 1 | Ramp valve |
| 2 | Refrigerating machine (Aluminium cold fill) |
| 3 | Tank feed line |
| 4 | Tank |
| 5 | First (pneumatic) valve |
| 6 | Manual valve |
| 7 | Bypass line |
| 8 | Second (pneumatic) valve |
| 9 | Throttle |
| 10 | Tank valve |
| 11 | Tank hose with tank coupling |
| 12 | Tear-away coupling |
| 13 | Flow measuring device |
| 14 | Safety valve |
| 15 | Chimney line |
| P1, P2 | Pressure peak |

What we claim is:

1. A method for determining leakage between a tank and a tank feed line wherein the tank is connected via a tank valve to the tank feed line, which has a first valve for shutting off the tank feed line, comprising prior to the tank being filled via the tank feed line, a flow of a pressurized hydrogen is conveyed with the first valve closed to the tank via a bypass line bridging the first valve, wherein the flow of medium is throttled in the bypass line by means of a throttle provided in the bypass line, so that a tank feed pressure acting on the tank valve rises in a controlled manner downstream of the throttle and wherein the tank valve is opened when the tank feed pressure exceeds a pressure in the tank, the tank feed pressure is measured, and the tank feed pressure established in the tank feed line after opening of the tank valve is adopted as the tank pressure and wherein if the adopted tank pressure remains constant over a defined time period, then no leakage is occurring and, the tank is filled with the pressurized hydrogen.

2. The method according to claim 1, characterized in that the bypass line is shut off by means of a second valve, which in particular is provided upstream of the throttle in the bypass line, wherein the second valve is opened to perform the pressure test with the first valve closed and the flow of hydrogen via the bypass line is conveyed to the tank.

3. The method according to claim 2, characterized in that the flow of hydrogen in the bypass line is throttled in such a way that the tank feed pressure, after said opening of the second valve, reaches the tank pressure within a predefined period of time.

4. The method according to claim 3 where the predefined period of time is within 10 seconds.

5. The method according to claim 2, characterized in that the bypass line is shut off by means of the second valve when the tank valve of the tank is pushed open by the rising tank feed pressure.

6. The method according to claim 1, characterized in that, prior to the filling, a predefined maximum pressure in the tank feed line prevails upstream of the first valve.

7. The method according to claim 6 wherein the predefined maximum pressure in the tank feed line is 875 bar.

8. A filling apparatus for filling a tank with a pressurized hydrogen comprising: a tank feed line, comprising a first valve configured for shutting off the tank feed line, wherein the tank feed line is configured to be connected downstream of the first valve to a tank to be filled, comprising a bypass line which bridges the first valve and wherein the bypass line comprises a second valve and a throttle, wherein the throttle is configured to throttle a flow of the hydrogen through the bypass line with the first valve closed and the second valve opened, that the tank feed pressure, established in the tank feed line, rises in a controlled manner downstream of the throttle.

9. The filling apparatus according to claim 8, characterized in that the throttle is disposed downstream of the second valve in the bypass line.

* * * * *